United States Patent
Seetharaman et al.

(10) Patent No.: US 8,840,086 B2
(45) Date of Patent: Sep. 23, 2014

(54) DISSIMILAR MATERIAL BONDING OF DRIVE SHAFT WITH FLOW CONTROL COMPONENT OF VALVE

(71) Applicant: TMS India Private Limited, Bangalore (IN)

(72) Inventors: Sivaraman Seetharaman, Bangalore (IN); Nagarajan Ramdas, Bangalore (IN); Damodaran Srinivasan, Bangalore (IN); Mohan Babu, Bangalore (IN); Dattatri Rao Kumaraswamy, Bangalore (IN)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 13/735,454

(22) Filed: Jan. 7, 2013

(65) Prior Publication Data

US 2013/0119291 A1     May 16, 2013

Related U.S. Application Data

(63) Continuation of application No. 12/665,903, filed as application No. PCT/IN2008/000381 on Jun. 17, 2008, now Pat. No. 8,366,072.

(30) Foreign Application Priority Data

Jun. 22, 2007    (IN) ............................ 1299/CHE/2007

(51) Int. Cl.
| | |
|---|---|
| *F16K 5/00* | (2006.01) |
| *F16K 25/00* | (2006.01) |
| *F16K 31/53* | (2006.01) |
| *F16K 31/50* | (2006.01) |

(52) U.S. Cl.
CPC ............... *F16K 25/005* (2013.01); *F16K 31/53* (2013.01); *F16K 31/508* (2013.01)
USPC ..................................... 251/315.03; 251/368

(58) Field of Classification Search
CPC ........ F16K 25/005; F16K 31/508; F01L 3/02; F01L 3/04; F01L 7/18
USPC ....................... 251/368, 356, 315.01–315.05; 123/188.3
See application file for complete search history.

(56) References Cited

U.S. PATENT DOCUMENTS

| | | | |
|---|---|---|---|
| 1,451,473 | A | 4/1923 | Pulverman |
| 3,561,098 | A | 2/1971 | Voelker et al. |

(Continued)

FOREIGN PATENT DOCUMENTS

| | | |
|---|---|---|
| DE | 426540 | 3/1926 |
| WO | WO9709550 | 3/1997 |

(Continued)

OTHER PUBLICATIONS

PCT International Search Report and Written Opinion for PCT/IN2008/000381, dated Jan. 23, 2009.

*Primary Examiner* — John K Fristoe, Jr.
*Assistant Examiner* — Jessica Cahill
(74) *Attorney, Agent, or Firm* — Fletcher Yoder P.C.

(57) ABSTRACT

A valve, in certain embodiments, includes a drive shaft configured to couple to a fluid control component and having an interlace material at the joint between the drive shaft and the fluid control component. A valve, in other embodiments, includes a fluid control component configured to receive a drive shaft and having an interlace material at the joint between the fluid control component and the drive shaft. A valve, in further embodiments, includes a drive shaft having a mechanical locking system and a fluid control component coupled to the drive shaft at a joint, wherein the spline aids in coupling the fluid control component to the drive shaft.

32 Claims, 6 Drawing Sheets

(56) References Cited

U.S. PATENT DOCUMENTS

| | | | |
|---|---|---|---|
| 3,934,606 A * | 1/1976 | Matthews | 137/454.6 |
| 4,540,457 A | 9/1985 | Lavalley | |
| 4,597,367 A * | 7/1986 | Hayashi | 123/188.3 |
| 5,094,200 A * | 3/1992 | Fontichiaro | 123/188.3 |
| 6,263,849 B1 | 7/2001 | Bonesteel et al. | |
| 6,589,021 B2 | 7/2003 | Kato et al. | |
| 6,752,603 B2 * | 6/2004 | Murase et al. | 417/571 |
| 6,912,984 B2 | 7/2005 | Narasimhan et al. | |
| 7,523,916 B2 | 4/2009 | Fenton | |
| 7,552,911 B2 | 6/2009 | Stark et al. | |
| 7,562,647 B2 | 7/2009 | Burton et al. | |
| 7,775,505 B2 | 8/2010 | Shakagori et al. | |
| 2003/0141480 A1 * | 7/2003 | Green | 251/315.01 |
| 2003/0209218 A1 | 11/2003 | Baur et al. | |
| 2004/0021120 A1 * | 2/2004 | Turnau, III et al. | 251/309 |
| 2006/0208213 A1 * | 9/2006 | Turnau et al. | 251/309 |
| 2007/0240668 A1 | 10/2007 | Burton et al. | |
| 2008/0083892 A1 | 4/2008 | Fenton | |
| 2009/0039305 A1 | 2/2009 | Shakagori et al. | |

FOREIGN PATENT DOCUMENTS

| | | |
|---|---|---|
| WO | WO0210620 | 2/2002 |
| WO | WO2006107005 | 10/2006 |

* cited by examiner

DISSIMILAR MATERIAL BONDING OF
DRIVE SHAFT WITH FLOW CONTROL
COMPONENT OF VALVE

CROSS REFERENCE TO RELATED
APPLICATIONS

This application claims priority to and benefit of U.S. application Ser. No. 12/665,903, entitled "Dissimilar Material Bonding of Drive Shaft with Flow Control Component of Valve," filed Dec. 21, 2009, which is herein incorporated by reference in its entirety, and which claims priority to and benefit of PCT Patent Application No. PCT/IN2008/000381, entitled "Dissimilar Material Bonding of Drive Shaft with Flow Control Component of Valve," filed Jun. 17, 2008, which is herein incorporated by reference in its entirety, and which claims priority to and benefit of India Patent Application No. 1299/CHE/2007, entitled "Dissimilar Material Bonding of Drive Shaft with Flow Control Component of Valve," filed Jun. 22, 2007, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As will be appreciated, oil and natural gas have a profound effect on modern economies and societies. Indeed, devices and systems that depend on oil and natural gas are ubiquitous. For instance, oil and natural gas are used for fuel in a wide variety of vehicles, such as cars, airplanes, boats, and the like. Further, oil and natural gas are frequently used to heat homes during winter, to generate electricity, and to manufacture an astonishing array of everyday products.

In order to meet the demand for such natural resources, companies often invest significant amounts of time and money in searching for and extracting oil, natural gas, and other subterranean resources from the earth. Particularly, once a desired resource is discovered below the surface of the earth, drilling and production systems are often employed to access and extract the resource. These systems may be located onshore or offshore depending on the location of a desired resource. Once the natural resource is extracted, it is generally transported to processing locations, such as refineries. The transportation of these resources is accomplished through a system of pipelines, which are controlled through various types of valves located at different points throughout the system.

One type of valve system used to isolate a section of pipeline and the fluid within the pipeline is referred to as a "double block and bleed" system. Such isolation is used to prevent contamination of the fluid by preventing contact with other fluids, and/or to meet regulatory safety requirements for valve and pipeline maintenance. Older designs for a double block and bleed system typically use two separate in-line valves having a section of pipe, or spool piece, between them. When both valves were shut off, a bleed valve was used to drain the spool and ensure seal integrity. This two valve system was superceded by a single double-seated valve, often referred to as a "double block and bleed" valve.

A double block and bleed valve is capable of sealing both upstream and downstream from the valve, and the valve body itself acts as the spool piece between the seals. The double block and bleed valve provides some advantages over a traditional two valve block and bleed system, such as ease and speed of operation, low maintenance requirements, and improved resistance to leaks. Such double block and bleed valves, or other valves used in the transportation system, may be formed from different metals or materials, such as a steel valve body, a cast iron valve plug, a steel valve stem, and so forth. The use of these different materials may introduce challenges in manufacturing that may affect performance once the valve is placed into service.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC
EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Prior to discussing the present invention in detail, it should be appreciated that embodiments of the present invention are typically implemented in a double block and bleed valve or other valve with a fluid control component. For example, other embodiments may include a ball valve, globe valve, butterfly valve, gate valve, a disc valve, or any other type of valve having a fluid control component. Although the embodiment discussed herein is a double block and bleed valve, it should be appreciated that the present invention is not limited to the double block and bleed valve embodiment.

Figure 1:
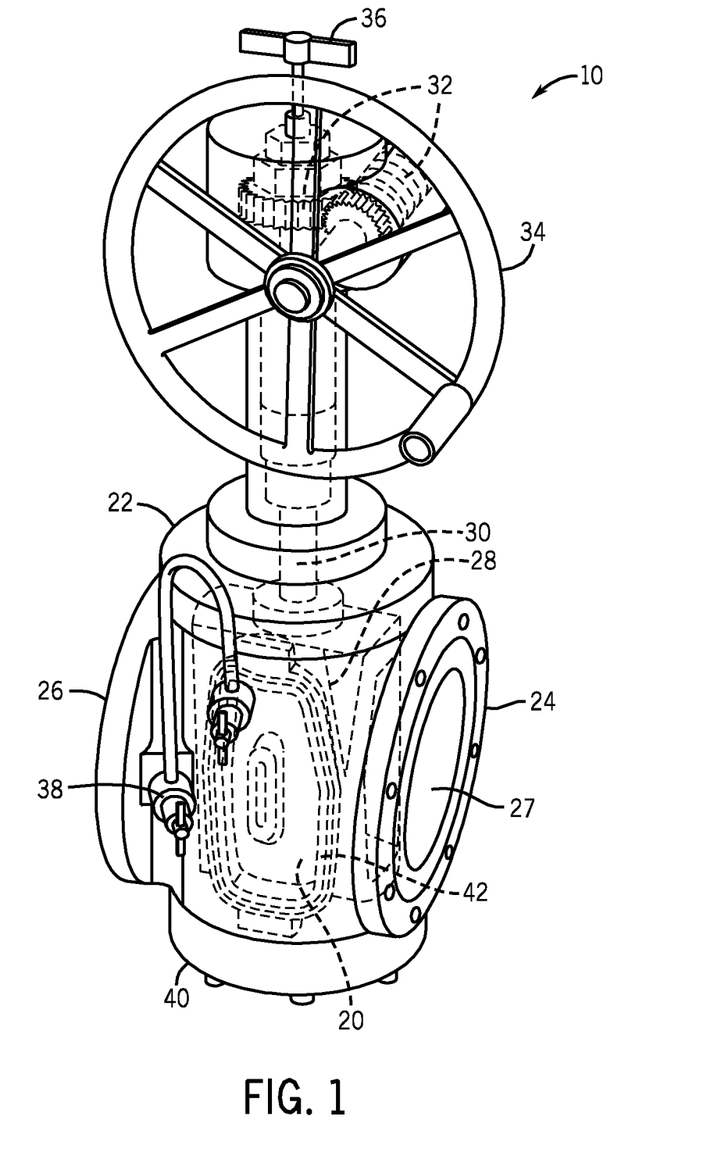
FIG. 1 is a perspective view of a double block and bleed valve in accordance with an embodiment of the present invention.

Turning now to the figures, FIG. 1 depicts a double block and bleed valve 10 that includes a valve plug 20 in accordance with an embodiment of the present invention. The double block and bleed valve 10 shown may be a Twin Seal™ valve manufactured by Cameron, Inc., Houston, Tex. The valve 10 may be used to isolate a section of pipeline or other components from other sections of pipeline or components. For example, the valve 10 may couple to a mineral extraction system such as a well, a wellhead, a subsea tree, a mineral deposit, a tool, a tool connector, a valve, a controller conduit, or a combination thereof. Thus, it should be appreciated that the valve 10 may be manufactured in various sizes or configurations depending on the application, but the primary design of the valve 10 may still provide the block and bleed capability described herein.

As shown in FIG. 1, the interior of the body 22 of the valve 10 depicts the components inside the valve 10, including the valve plug 20. The valve plug 20 is rotatable and vertically translatable to open and close the valve 10, as described further below. Additionally the valve 10 includes an inlet 24 and an outlet 26, although the inlet and outlet sides of the valve are interchangeable. The valve 10 may be oriented to provide accessibility to the valve 10 for operation and servicing. The inlet 24 and outlet 26 are configured to provide a secure and leakfree seal with the pipeline or other fluid transfer component in the system. The valve plug 20 has a port 27 opening though the valve plug 20 to enable fluid to flow from the inlet 24, through the port 27, and out of the outlet 26.

The valve plug 20 includes a fluid control component 28, and a trunion or drive shaft 30. In some embodiments, the fluid control component 28 may be a plug, cone, disc, ball, or gate, or another structure configured to partially or completely open and/or close a fluid flow path, thereby controlling fluid flow for a particular application. The drive shaft 30 is rotatable and provides for operation of the fluid control component 28. As will be discussed further below, the fluid control component 28 may be manufactured from cast iron, such as grey iron or ductile iron, or other metal or alloy, and the drive shaft 30 may be manufactured from steel, such as 17-4Ph steel. In some embodiments, the fluid control component 28 may be cast from WCC/WCB, CF8M, CF8, A1B2, or any other cast, forged or wrought alloy. In some embodiments, the drive shaft 30 may be manufactured from SS41O, SS316, SS3I6L, EN1 plated 410, EN1 plated 1045, ENi plated 4140, Inconel, Monel, or any other suitable material. In other embodiments, the shaft and/or fluid control component may be non-metallic materials, such as plastics, ceramics, etc.

The valve 10 also includes a set of worm gears 32 and a wheel 34 coupled to the worm gear set 32 to enable operation of the valve 10. At the top of the valve 10 is an indicator shaft and plug 36. The indicator shaft and plug 36 indicate if the valve 10 is in an open or closed position. The wheel 34 provides for manual operation of the valve 10. The valve 10 may also be coupled to electric or pneumatic actuators to provide for automatic operation.

The valve 10 may also include a pressure relief device, such as a safety bleed 38. The safety bleed 38 may include one or more valves designed to open at a critical pressure, thereby relieving any pressure inside the valve 10 due to increases in temperature, thermal expansion, and so forth. The safety bleed 38 may also include a manual valve which may open manually to relieve pressure after the valve 10 is closed. The safety bleed 38 and corresponding valves may include other safety mechanisms for compliance with government and safety regulations and to ensure safe operation of the valve 10. For additional safety, the valve 10 may include a lower drain cavity 40 that enables draining and purging of any fluid or pressure build up in the valve body 22.

To operate the block and bleed valve 10, an operator or actuator turns the valve wheel 34. Turning the valve wheel 34 rotates the drive shaft 30 and valve body 22, thereby turning the valve plug 20. As shown in FIG. 1, the valve 10 is "open" and the valve plug 20 is oriented to enable fluid to flow through the port 27 and the valve 10. The valve plug 20 may include slip seals 42 which are completely isolated from fluid flow when the valve 10 is in the open position. To close the valve and prevent fluid flow through the valve 10, the operator or actuator turns the valve wheel 34 to rotate the valve plug 20 and "close" the valve 10. During operation, the valve plug 20 rotates so that the slip seals 42 compress against the sides of the valve body 22 and form a seal. Additionally, metal-to-metal seating between the valve plug 20 and the valve body 22 may also provide additional sealing.

As explained above the valve plug 20 may comprise two different metals, such as steel for the drive shaft 30 and cast iron for the fluid control component 28, and may be referred to as a dual metal valve plug. The different metals or materials provide for different material and mechanical properties, e.g., strength or creep, which may be desirable for the different functions of each component of the valve plug 20. Although the use of a dual metal valve plug may be preferred, a dual metal valve plug may introduce various problems during the manufacturing or operation of the valve 10. The material chosen for the drive shaft 30 and for the fluid control component 28 may have different thermal expansion and contraction characteristics that affect the manufacturing process, as will be described further below.

Figure 2:
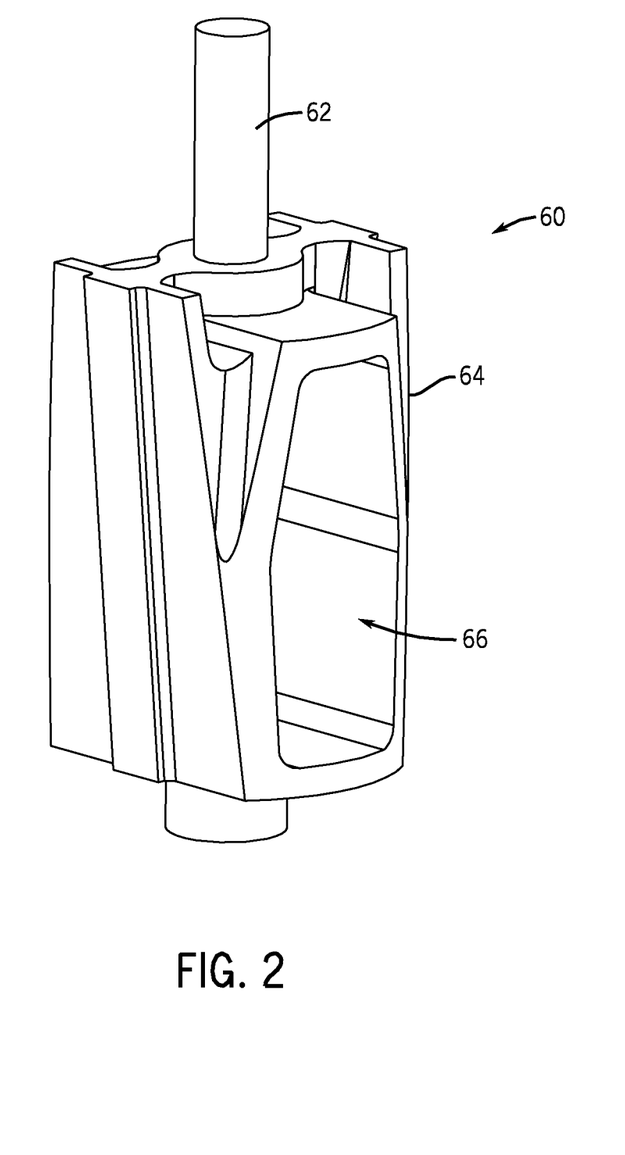
FIG. 2 is a perspective view of a dual metal valve plug for a double block and bleed valve in accordance with an embodiment of the present invention.

Turning now to FIG. 2, a perspective view of a dual metal valve plug 60 having a trunion or drive shaft 62 and a fluid control component 64 is shown in accordance with an embodiment of the present invention. As mentioned above, in some embodiments the fluid control component 64 may be a plug, cone, disc, ball, or gate. Advantageously, embodiments of the present invention provide techniques for anchoring the drive shaft 62 to the fluid control component 64 and strengthening the joint to address the problems described above, such that the drive shaft 62 cannot rotate or translate independently of the fluid control component 64. For example, an interface material may be used at the interface between the drive shaft 62 and the fluid control component 64 as discussed below. This interface material improves the bonding between the drive shaft 62 and the fluid control component 64, thereby improving the manufacturability of the valve 10.

In one embodiment discussed herein, the drive shaft 62 may be made of steel and the fluid control component 64 may be made of cast ductile iron. These two materials illustrate difficulties that may occur through the use of two materials to form the dual metal valve plug. For example, molten ductile iron is generally cast at a much lower temperature than the higher melting steel drive shaft 62. The steel drive shaft 62 is relatively large and can act as a heat sink or chill and negatively affect the casting process. The chilling can adversely affect formation of a desired metallurgical bond between the ductile iron and the steel. Further, the steel drive shaft 62 cannot be preheated without possibly damaging the desired characteristics of the steel. Oxidation may occur on the steel drive shaft 62, thereby impairing formation of the metallurgical bond between the steel and the cast ductile iron. Additionally, any metallurgical bond that forms between the steel and the cast ductile iron may be impaired or provide inadequate mechanical properties.

As a result of these challenges in manufacturing a dual metal valve plug 60, specific problems may arise during manufacturing or operation of the valve plug. For example, the joint between the base of the drive shaft 62 and the fluid control component 64 may allow leaks to form and cause pressure or fluid to leak outside of the valve plug or corrode the steel drive shaft 62. A leak path in the port 66 of the valve plug 60 may occur if the drive shaft 62 is cast up to the surface of the port 66. In addition, a weak joint between the drive shaft 62 and fluid control component 64 may cause the valve drive shaft 62 to shake during operation of the valve. The desire for a high strength joint between the drive shaft 62 and the fluid control component 64 may require close monitoring of the manufacturing process to ensure adequate anchoring between the drive shaft 62 and the fluid control component 64 and inadequate anchoring could result in a number of rejections during the manufacturing process.

As will be described further below, the distance between the end of the drive shaft 62 and the valve port 64 may be increased during the casting process to minimize the possibility of leakage through the joint from the port 66. Additionally, the drive shaft 62 may include a mechanical locking system, such as a spline, designed to ensure more secure anchoring at the joint with the fluid control component 64. Finally, the base of the drive shaft 62 or mechanical locking system of the drive shaft 62 may be coated, plated, or generally surrounded with a layer of an interface material to provide better bonding with the fluid control component 64. In other embodiments, a shaft receptacle in the fluid control component 64 may be coated, plated, or generally covered with a layer of the interface material, and then the drive shaft 62 may be subsequently formed or bonded with the fluid control component 64 in the shaft receptacle. In either of these scenarios, the interface material may be made of a material different from both the drive shaft 62 and the body 64. For example, the interface material may include zinc, tin, lead, aluminum, brass, copper, nickel, gold, silver, cadmium, cobalt, or satellite, alone, in any combination thereof, or in any alloy thereof.

In one embodiment, the length of the drive shaft 62 may be about 160 mm to about 200 mm. In this embodiment, the diameter of the drive shaft 62 may be about 45 mm, and the joint between the drive shaft 62 and the fluid control component 64 may occupy 40 mm to about 50 mm of the length of the drive shaft 62. Further, as will be discussed below, the end of the drive shaft 62 may be inset at a distance of about 3 mm to about 6 mm from the surface of the port 66. However, other inset distances are within the scope of the present embodiments. For example, the inset distance may be 1, 2, 3, 4, 5, 6, 7, 8, 9, 10, or more millimeters.

Figure 3:
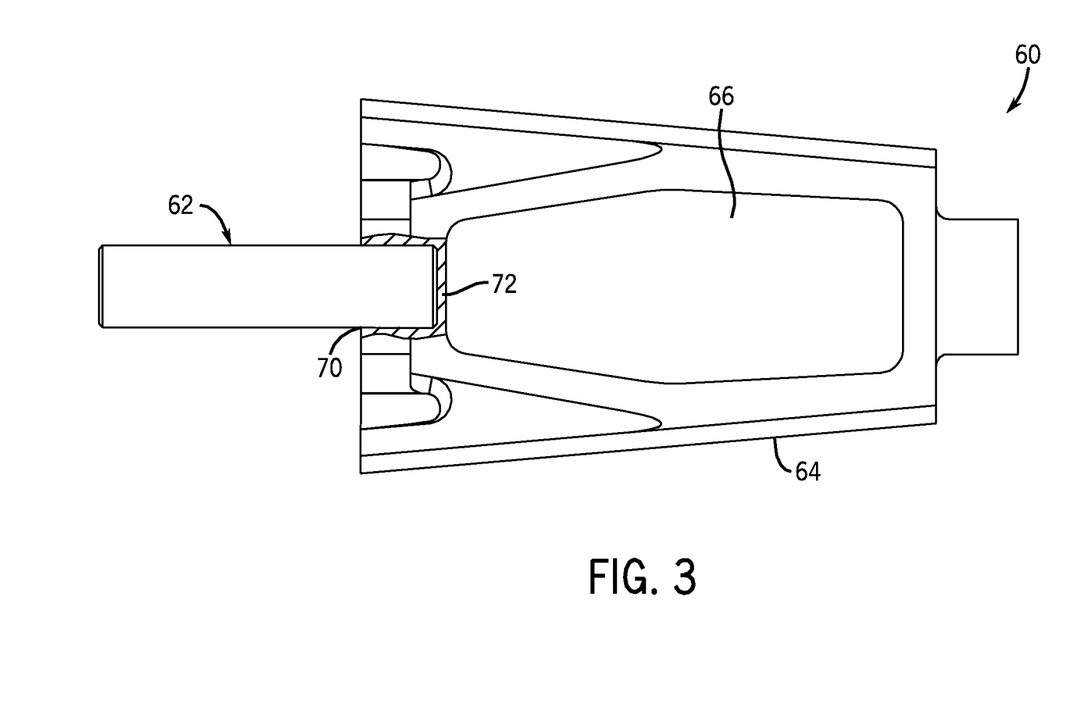
FIG. 3 is a cross-section of the dual metal valve plug of FIG. 3 in accordance with an embodiment of the present invention.

FIG. 3 illustrates a cross section of the valve plug 60 of FIG. 2 in accordance with an embodiment of the present invention. The steel drive shaft 62 is coupled to the fluid control component 64 at the joint 70. In the illustrated embodiment, the drive shaft 62 is cast offset from the port surface 72 (e.g., inset into the interior of the body 64) to substantially reduce or eliminate a potential leak path from the port through the fluid control component 64. For example, in the embodiment shown in FIG. 3, the drive shaft 62 is cast at least 5 mm from the port surface 72. In other embodiments the drive shaft 62 may be cast from about 3 mm to about 6 mm from the port surface 72.

Figure 4A:
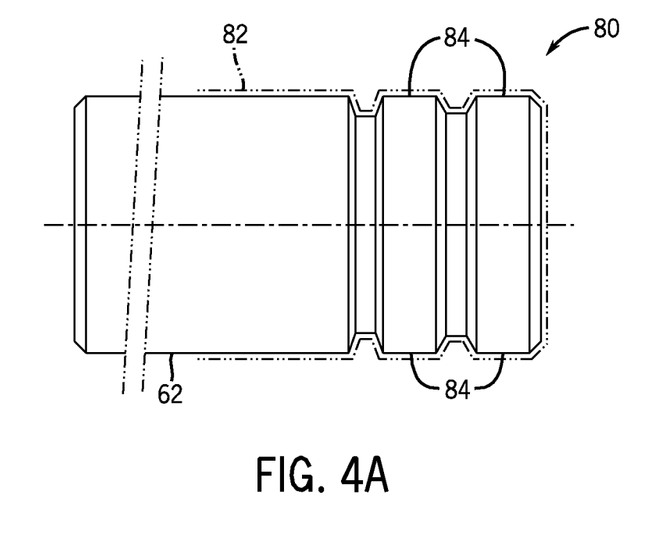
FIGS. 4A and 4B are side and front views respectively of a mechanical locking system and shaft of the dual metal valve plug of FIG. 3 in accordance with an embodiment of the present invention.
Figure 4B:
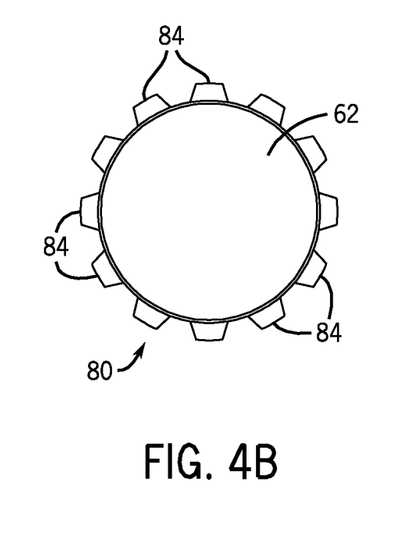

Referring now to FIGS. 4A and 4B, a side view and an end view of the spline 80 of the drive shaft 62 are shown. To further strengthen anchoring at the joint 70, an interface material 82 may be applied to the drive shaft 62, or the fluid control component 64 or both. In other words, the drive shaft 62 may be formed, and then coated with a layer of the interface material 82 completely about a circumference of an end portion of the drive shaft 62. Subsequently, the fluid control component 64 may be formed about the drive shaft 62 at the end portion of the drive shaft 62 having the interface material 82. Alternatively, the fluid control component 64 may be formed, and then coated with a layer of the interface material completely along an interior shaft receptacle configured to receive the drive shaft 62. Subsequently, the drive shaft 62 may be provided (e.g., by casting or other bonding techniques) into the shaft receptacle at the region of the interface material 82. In either scenario, the interface material 82 may be disposed at least substantially or entirely between and separating the different materials of the drive shaft 62 and the body 64, thereby acting as an intermediate transition material to improve the bonding of the dissimilar materials. The interface material 82 may be chosen to create an inter-metallic bond or phase between the material of the drive shaft 62 and the material of the fluid control component 64, and/or chosen such that an amalgam is formed with either the material of the drive shaft 62 or the fluid control component 64.

In one embodiment, the interface material 82 may be tin plated onto the drive shaft 62. Tin may form an inter-metallic phase or bond with the ductile iron or other material chosen for the fluid control component 64, such as through solid state diffusion. The tin layer may be applied to some or all of the portion of the shaft 32 that will be in contact with the fluid control component 64. In some embodiments, the tin layer may be electroplated onto the drive shaft 62 or may be applied to the shaft 32 through hot dip plating (usually done above the melting point of tin, i.e. greater than 218° C.) or by the chemical process termed as "electro-less plating". Electroless plating of the tin interface material 82 may be performed at or near room temperature and thus may be "cold process." Such a cold process minimizes the chance of altering the material or mechanical properties of the steel drive shaft 62. The thickness of the tin interface layer 82 may vary depending on the size and shape of the steel drive shaft 62 and the valve plug 60 and the application process. In some embodiments, the thickness of the tin may be about 3 microns to about 8 microns, about 6 microns to about 12 microns, about 10 microns to about 20 microns, about 15 microns to about 30 microns, or about 25 microns to about 50 microns.

In other embodiments, other interface materials such as zinc, lead, aluminum, brass, copper, nickel, gold, silver, or cadmium may be applied to the drive shaft 62 or the fluid control component 64. For example, zinc, tin, lead, aluminum, brass or other metal or alloy that can form an inter-metallic bond with iron may be applied by hot-dip coating the steel shaft. Alternatively, zinc, copper, tin, nickel, gold, silver, cadmium, lead, aluminum or other metals or alloys may be applied to the shaft by electroplating, or electro-less plating. Further, metal spraying, such as plasma spraying, of the steel shaft with nickel, cobalt, tin, copper, satellite, or other metals or alloys may be performed. In another embodiment, the steel surface of the drive shaft 62 may be activated by shot-peening and/or chemical treatment.

In addition to the improved anchoring provided by the interface material 82, mechanical anchoring may be further strengthened by the design of a mechanical locking system, such as a spline 80. In the embodiment depicted in FIGS. 4A and 4B, various protrusions 84 extend from the drive shaft 62. In one embodiment, the drive shaft 62 may include two rows of protrusions 84, with each row having twelve protrusions.

The protrusions 84 may be cut into the end of the drive shaft 62 during manufacture of the drive shaft 62 and before casting of the fluid control component 64 around the drive shaft 62. After casting the fluid control component 64 around the drive shaft 62, the protrusions 84 provide a mechanical locking system between the drive shaft 62 and the fluid control component 64. The improved anchoring provided by the mechanical interlock of the protrusions 84 and the interface material 82 enable maximum transmission of torque from the operation or actuation mechanism described above to the valve plug 60 without the shaft shaking and breaking problems described above. Further, cutting the protrusions 84 into the drive shaft 62 during manufacture provides improved anchoring of the protrusions 84 to the drive shaft 62 as compared to welding, inserting, or otherwise attaching the protrusions 84 to the drive shaft 62.

In one embodiment, each of the protrusions 84 may be about 6.5 mm wide, and spaced about 3.5 mm apart. Each of the protrusions 84 may be 9.2 mm long, with the sides of the protrusions 84 slanted at a 30° angle. The height of each the protrusions 84 may be about 7 mm. However, any other dimensions, arrangements, or spacing of the protrusions 84 are within the scope of the present embodiments.

Figure 5A:
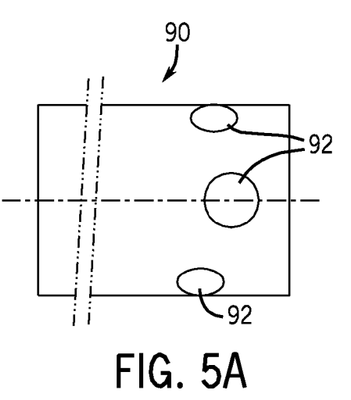
FIGS. 5A, 5B, 5C, and 5D are side views of alternative embodiments of a mechanical locking system and shaft of a dual metal valve plug in accordance with the present invention.

FIGS. 5A, 5B, 5C, and 5D depict alternative embodiments of the mechanical locking system of the drive shaft 62 in accordance with embodiments of the present invention. The first alternative embodiment 90 in FIG. 5A depicts welded deposits 92 that can provide a mechanical locking system with the fluid control component 64. In the embodiment 90, three welded deposits 92 are radially spaced 120 degrees around the circumference of the drive shaft 62.

Figure 5B:
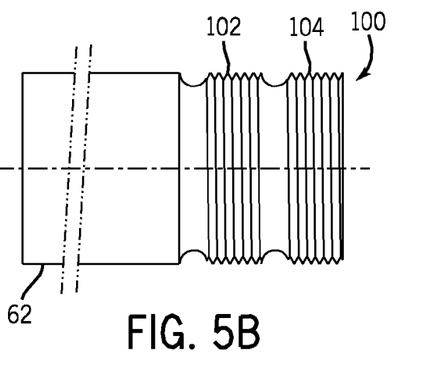

In FIG. 58, the second alternative embodiment 100, a mechanical locking system includes left hand and right hand unified coarse (UNC) threads 102 and 104. The width of the right hand threads 104 is about 15.8 mm, and the width of the left hand threads is about 19.1 mm. Again, the left hand and right hand UNC threads 162 and 104 may provide a mechanical locking system with the fluid control component 64 to better anchor the joint between the drive shaft 62 and fluid control component 64.

Figure 5C:
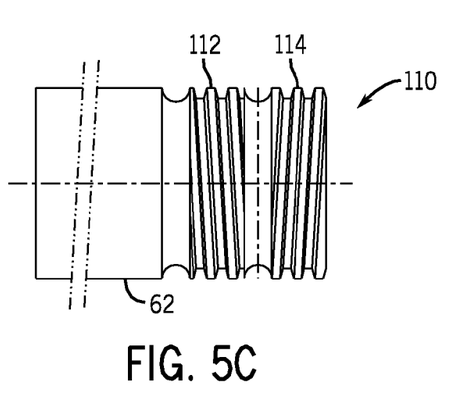

The third alternative embodiment 110 in FIG. 5C depicts a mechanical locking system that includes left hand and right hand Acme or square threads 112 and 114. The width of the right hand Acme thread 112 is 15.8 mm, and the width of the left hand Acme thread 114 is 19.1. In the embodiment, the Acme threads 112 and 114 may have about a 5 mm pitch. The function of the Acme threads 112 and 114 are to provide mechanical interlocking with the fluid control component 64.

Figure 5D:
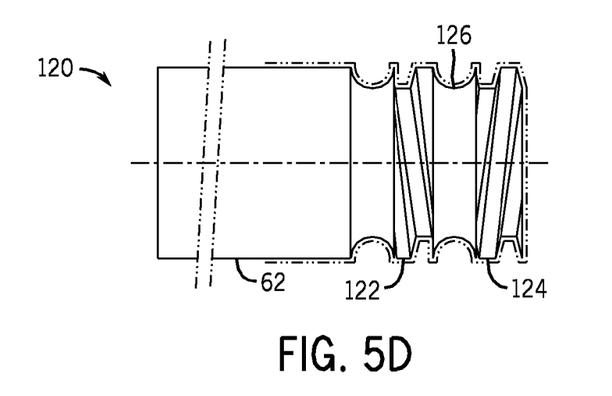

Finally, FIG. 5D depicts a fourth alternative embodiment 120 that has a mechanical locking system having Acme threads 122 and 124 and an interface material 126. The left hand Acme thread pattern 122 has a width of about 19.1 mm, and the width of the Acme threads 124 is about 15.8 mm. In the embodiment, the Acme threads 122 and 124 have a pitch of 10 mm. In addition to the mechanical locking provided by the Acme threads 122 and 124, the interface material 126 may provide an inter-metallic phase and/or bond between the drive shaft 62 and the fluid control component 64. In one embodiment, the interface material 126 may be tin and plated onto the drive shaft 62 using the technique described above. In such an embodiment, the thickness of the tin may be about 3 microns to about 6 microns.

The mechanical locking system design of the drive shaft 62 may include many other embodiments not limited to the designs described above in FIGS. 4 and 5. For example, the mechanical locking system may include a hole in the drive shaft 62 through which the molten iron may fill to form a cross anchor during the casting process. Additionally, steel pins, flanges, buttons, or any other protrusion may be inserted, welded, screwed, fastened, or otherwise attached to the drive shaft 62. Further, numerous profiles may cut into the drive shaft 62 and are not limited to the protrusions or threads discussed above. For example, fine threads, square threads, Acme threads, worm threads, slots, keyways, slots, continuous grooves, interrupted grooves, knurles, or any other configuration may be cut into the drive shaft 62.

Figure 6:
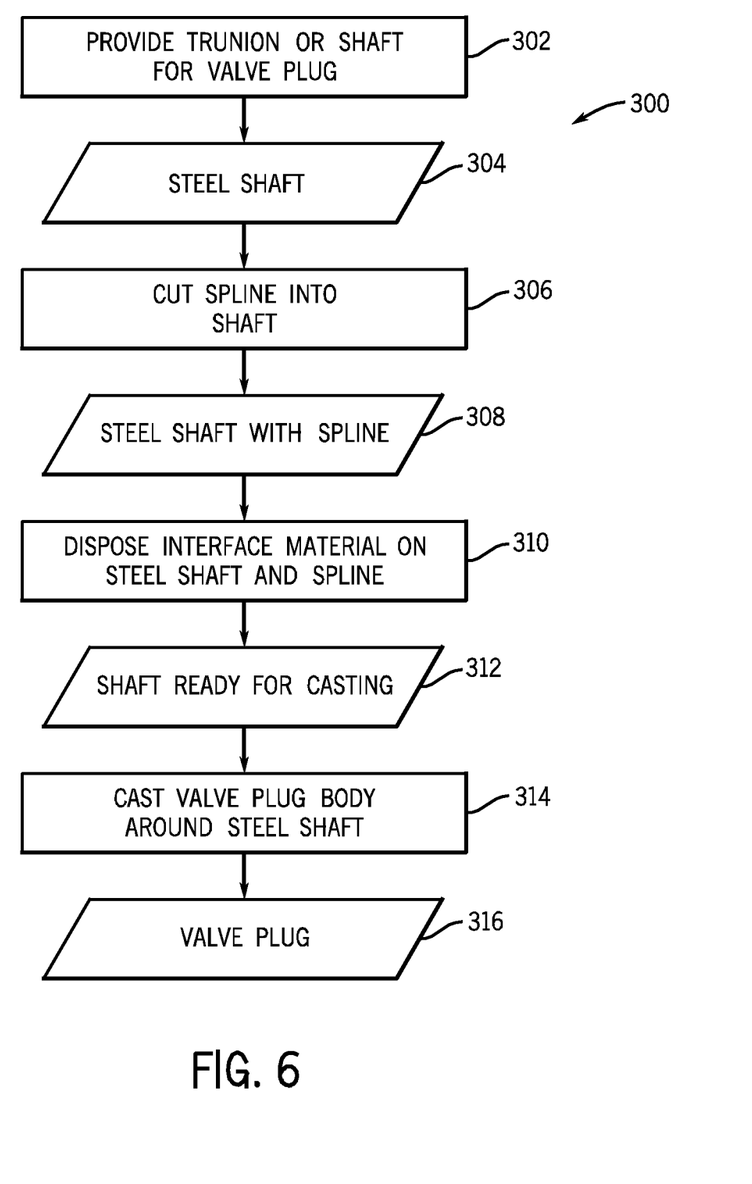
FIG. 6 is a flowchart of a manufacturing process for a dual metal valve plug in accordance with an embodiment of the present invention.

FIG. 6 depicts a manufacturing process 300 of a dual metal valve plug in accordance with an embodiment of the present invention. As discussed above, embodiments of the present invention provide various techniques to anchor the shaft of the valve plug in the fluid control component, and may improve manufacturing yields and minimize production failures and waste. Further, foundry rejections such as leak paths, poor weld on, loose shafts, and run outs may be minimized or eliminated. In the embodiment discussed in FIG. 6, the dual metal valve plug has a steel shaft and a cast iron fluid control component. However, other metals or alloys may be used, as further described herein.

A trunion or drive shaft is provided (block 302), such as a 17-4Ph steel shaft as described above. Alternatively, the drive shaft 304 may formed from SS41O, SS316, SS3I6L, ENi plated 410, ENi plated 1045, ENi plated 4140, Inconel, Monel, or any other suitable material. A mechanical locking system, such as a spline design discussed above, is cut into the portion of the shaft that will be in contact with the fluid control component (block 306), such as the protrusions described above in FIGS. 4A and 4B or the alternative designs described in FIG. 5A-5D. In some embodiments, the shaft with spline (block 308) may be ready for casting. In the embodiment depicted in FIG. 6, an interlace material is disposed on the shaft with spline (block 310). The interface material may be tin or any of the other materials, such as the alternatives described above, and may be disposed on the shaft through the electroplating, electro-less plating, hot dip plating, or any other suitable technique.

In one embodiment, electro-less plating may be performed at room or near room temperature to advantageously preclude the formation of tin oxides that may affect the material properties of the tin interface. For example, applying a tin interface material through plasma spraying, performed at a temperature of over 218° C., may be above the melting point of tin and thus affect the material or mechanical properties of the interface or any inter-metallic bond. As discussed above, the thickness of the tin layer may depend on the size of the shaft and valve plug and may range from about 3 microns to about 8 microns, about 6 microns to about 12 microns, about 10 microns to about 20 microns, about 15 microns to about 30 microns, or about 25 microns to about 50 microns. Additionally, the application process may affect the thickness of the layer of tin. For example, plasma spraying may result in a thickness of about 100 to about 200 microns, yet hot-dip plating may result in a thickness of about 50 microns.

The shaft may now have both a spline and interface material (312) to aid in both mechanically and chemically strengthening the joint between the shaft and the fluid control component. The fluid control component is then cast around the shaft to form the valve plug (block 314), such that the fluid control component conforms completely around that portion of the shaft at the joint, completely contacting the shaft and/or interface material, The fluid control component may be a cast iron, such as gray cast iron or ductile iron, or alternatively may be WCC, WCB, CF8M, CF8, A1B2, or any other cast, forged or wrought alloy. In one embodiment, the fluid control component may be cast ductile iron and the casting process performed at a temperature about 2,650° F. (1454° C.). During the casting process, as mentioned above, the tin interface material and the cast ductile iron fluid control component may form an inter-metallic phase, such as a phase of 9% tin-iron phase or a <3% tin-iron thin film phase, depending on the temperature of the region. Additionally, at the interface, the tin-ductile iron alloying may promote & enhance form a more pearlitic structure in interface zones even at less than 1% tin, resulting in desired adhesion and mechanical properties at the interface, this improving anchoring at the joint.

Additionally, as described above, the placement of the steel shaft during the casting process (block 314) may also affect integrity of the joint. During the casting process, as a consequence of the different material properties of the two materials and lower contraction of the cast iron fluid control component, the steel shaft may "shrink" or "tear" away from the ductile iron, creating a leak path in the port of the valve plug. The joint may be weakened, resulting in shaking or detachment of the shaft from the fluid control component during manufacture, machining, assembly, or testing of the valve. Thus, in one embodiment, the shaft is cast at about 5 mm away from the port surface of the valve plug body to enable the ductile iron to form in front of the end of the shaft during the casting process 310. Alternatively, in other embodiments, the shaft may be cast about 3 mm to about 6 mm inset from the port surface of the fluid control component. The distance of the shaft from the port surface of the fluid control component may vary depending on the size, shape, and/or geometry of the valve plug. The valve plug casting when machined and coated (block 316) is then ready for testing or assembly into the valve.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A valve, comprising:
    a valve body;
    a fluid control component disposed in the valve body;
    a shaft coupled to the fluid control component, wherein the shaft extends through the valve body;
    an interface material bonding the fluid control component and the shaft, wherein a third material composition of the interface material is disposed directly between a first material composition of the shaft and a second material composition of the fluid control component such that the interface material directly contacts the first material composition and the second material composition, wherein the first, second, and third material compositions are different from one another, wherein the third material composition of the interface material comprises zinc, tin, lead, aluminum, brass, gold, cadmium, or cobalt, or any combination thereof.

2. The valve of claim 1, wherein the interface material forms an intermetallic bond with a first metal of the shaft and a second metal of the fluid control component.

3. The valve of claim 1, wherein the interface material forms a metallurgical bond, phase, amalgam, or any combination thereof, with a first metal of the shaft and a second metal of the fluid control component.

4. The valve of claim 1, wherein the interface material isolates the first material composition of the shaft from the second material composition of the fluid control component.

5. The valve of claim 1, wherein the interface material has a thickness of about 5 microns to about 15 microns.

6. The valve of claim 1, wherein the third material composition of the interface material consists essentially of tin.

7. The valve of claim 1, wherein the third material composition of the interface material further comprises copper, nickel, or silver, or any combination thereof.

8. The valve of claim 1, wherein the first material composition of the shaft consists essentially of steel.

9. The valve of claim 1, wherein the second material composition of the fluid control component consists essentially of iron.

10. The valve of claim 1, wherein first material composition of the shaft is steel, the second material composition of the fluid control component is a cast iron, and the third material composition of the interface material comprises tin.

11. The system of claim 1, wherein the third material composition of the interface material comprises the lead.

12. The system of claim 1, wherein the third material composition of the interface material comprises the aluminum.

13. The system of claim 1, wherein the third material composition of the interface material comprises the brass.

14. The system of claim 1, wherein the third material composition of the interface material comprises the gold.

15. The system of claim 1, wherein the third material composition of the interface material comprises the cadmium.

16. The system of claim 1, wherein the third material composition of the interface material comprises the cobalt.

17. The valve of claim 1, comprising an actuator coupled to the shaft.

18. The valve of claim 17, wherein the actuator comprises a manual actuator.

19. The valve of claim 1, wherein the shaft is coupled to the fluid control component at a male-female joint, and the third material composition of the interface material is disposed at the male-female joint directly between the first material composition of the shaft and the second material composition of the fluid control component.

20. The valve of claim 19, wherein the male-female joint comprises a shaft receptacle extending into the fluid control component to an end position inset from an interior surface of the fluid control component, and the shaft receptacle does not extend through the interior surface.

21. The valve of claim 19, wherein the male-female joint comprises a spline, and the interface material is disposed on the spline.

22. A method, comprising:
    bonding a shaft to a fluid control component of a valve at a joint having an interface material, wherein the interface material is disposed directly between a first material of the shaft and a second material of the fluid control component such that the interface material directly contacts the first and second materials, wherein the first and second materials are different from one another, wherein the interface material comprises zinc, tin, lead, aluminum, brass, gold, cadmium, or cobalt, or any combination thereof.

23. The method of claim 22, wherein shaft is made of steel, the fluid control component is made of a cast iron, and the interface material comprises tin.

24. The method of claim 22, comprising covering a spline of the joint with the interface material.

25. The method of claim 22, comprising casting the fluid control component over a portion of the shaft having the interface material.

26. The method of claim 22, comprising coupling a manual actuator to the shaft, wherein the manual actuator is disposed external to a body of the valve containing the fluid control component.

27. A system, comprising:
a shaft; and
an interface material disposed circumferentially about an outer perimeter of the shaft, wherein the interface material is configured to facilitate bonding between a component and the shaft wherein the interface material directly contacts the shaft and is configured to directly contact the component, wherein the interface material is different from a first material of the shaft, and the interface material comprises zinc, tin, lead, aluminum, brass, gold, cadmium, or cobalt, or any combination thereof.

28. The system of claim 27, comprising a valve having the shaft with the interface material.

29. The system of claim 27, wherein the shaft comprises a spline, and the interface material is disposed over the spline.

30. The system of claim 1, wherein the third material composition of the interface material consists essentially of tin, lead, aluminum, brass, gold, cadmium, or cobalt.

31. The system of claim 27, comprising the component, wherein the shaft comprises a plurality of protrusions configured to transfer torque between the shaft and the component, and the interface material is disposed over the plurality of protrusions between the shaft and the component.

32. The system of claim 31, wherein the interface material comprises tin.

* * * * *